(12) United States Patent
Stark

(10) Patent No.: US 6,241,415 B1
(45) Date of Patent: Jun. 5, 2001

(54) ADJUSTABLE AND REUSABLE HANDLE FOR CONTAINERS

(76) Inventor: Marvin B. Stark, 3762 E. 24th St., Tucson, AZ (US) 85713

( * ) Notice: Subject to any disclaimer, the term of this patent is extended or adjusted under 35 U.S.C. 154(b) by 340 days.

(21) Appl. No.: 08/758,343

(22) Filed: Dec. 3, 1996

(51) Int. Cl.$^7$ .................................................. E21B 19/16
(52) U.S. Cl. .................... 403/17; 16/114 R; 16/DIG. 25; 294/31.2; 220/758; 220/759
(58) Field of Search ................. 403/17, 18, 362; 16/DIG. 25, 114 R; 294/31.2, 27.1; 224/251; 220/759, 758, 757; 24/274 R, 191, 170

(56) References Cited

U.S. PATENT DOCUMENTS

| | | |
|---|---|---|
| 1,394,033 * | 10/1921 | McLeod et al. . |
| 1,672,311 * | 6/1928 | Ermatinger ...................... 294/31.2 X |
| 1,828,106 * | 10/1931 | Ertola ............................... 294/31.2 X |
| 1,977,367 * | 10/1934 | Wolcott ........................... 294/31.2 X |
| 2,275,876 | 3/1942 | Werfel . |
| 2,305,492 | 12/1942 | Poglein . |
| 2,490,838 | 12/1949 | Serio . |
| 2,790,669 * | 4/1957 | Crawford ............................ 294/31.2 |
| 2,917,338 * | 12/1959 | Blue ..................................... 294/31.2 |
| 2,922,558 | 1/1960 | Harvey . |
| 2,942,910 * | 6/1960 | Bramming .......................... 294/31.2 |
| 2,967,071 | 1/1961 | Deschene . |
| 3,050,326 | 8/1962 | Miller . |
| 3,431,007 | 3/1969 | Paulsen et al. . |
| 3,482,867 | 12/1969 | Allen . |
| 4,433,864 | 2/1984 | Byrd . |
| 4,463,978 | 8/1984 | Mountain et al. . |
| 4,560,193 | 12/1985 | Beebe . |
| 4,667,359 * | 5/1987 | Polotti .............................. 294/31.2 X |
| 4,821,372 | 4/1989 | Casiello . |
| 4,874,109 | 10/1989 | Cook . |
| 4,881,294 * | 11/1989 | Riedl .................................. 16/114 R |
| 5,131,116 * | 7/1992 | Bowdler .............................. 16/114 R |
| 5,202,094 | 4/1993 | Jones et al. . |
| 5,373,608 | 12/1994 | Welch . |
| 5,416,950 | 5/1995 | Dornbush et al. . |
| 5,425,153 * | 6/1995 | Vosbikan .............................. 15/257.2 |

FOREIGN PATENT DOCUMENTS

0615515 * 2/1961 (CA) .

* cited by examiner

Primary Examiner—Terry Lee Melius
Assistant Examiner—William L. Miller
(74) Attorney, Agent, or Firm—Antonio R. Durando

(57) ABSTRACT

A device for holding a container includes an elongated handle. An adjustable band is mounted at one end, and has two sections which project from opposite sides, of the handle. The two sections overlap to form a loop, and each section is provided with a series of openings. A clip receives the overlapping sections and comprises a detent which can be moved into and out of the openings. The band is flexible, and the overlapping sections of the band can be shifted relative to one another to change the diameter of the loop. When the diameter has been adjusted, the detent is passed through registering openings of the overlapping sections to fix the sections with respect to each other. An anchoring bar is also mounted on the handle and is movable radially of the loop between a retracted position inside the handle and an extended position in which the bar projects into the loop. The bar stabilizes a container which is gripped by the band.

7 Claims, 2 Drawing Sheets

ADJUSTABLE AND REUSABLE HANDLE FOR CONTAINERS

BACKGROUND OF THE INVENTION

1. Field of the Invention

The invention relates to a device for holding articles.

2. Description of the Prior Art

When the contents of a can are to be cooked over a campfire, the contents are transferred to a pot or pan which is then placed over the fire. Once the contents have been cooked and eaten, the pot or pan is washed, dried and stored.

The tedious tasks of washing and drying the pot or pan could be eliminated by cooking the contents of the can in the latter. However, this is not possible because the can lacks a handle which would allow the can to be placed over and removed from the fire.

Handles which can be removably attached to various types of containers are disclosed in U.S. Pat. Nos. 2,275,876; 2,305,492; 2,490,838; 2,922,558; 2,967,071; 3,050,236; 3,431,007; 3,482,867; 4,463,978; 4,560,193; 4,874,109; and 5,202,094. All but one of these handles include a band which encircles a container and is tightened by a locking element. The remaining handle consists of two springs which again encircle a container and are connected to a common lifting member.

While the handles of the prior art are adequate, they do not grip containers as firmly as desirable.

SUMMARY OF THE INVENTION

It is an object of the invention to provide a device which is capable of holding articles more firmly.

Another object of the invention is to provide a method which enables better gripping of articles to be obtained.

The preceding objects, as well as others which will become apparent as the description proceeds, are achieved by the invention.

One aspect of the invention resides in a device for holding articles. The device comprises a handle, and a clamping member on the handle designed to at least partly surround and grip an article. The clamping member is adjustable to the size of the article. The device further comprises an anchoring member on the handle which is movable between a retracted position and an extended position and is designed to abut and stabilize the article.

The device of the invention uses two members to secure an article. One of these is a clamping member which at least partly surrounds the article. The other is an anchoring member which can be extended into abutment with the article once the article has been gripped by the clamping member. The anchoring member allows the grip of the clamping member to be tightened thereby stabilizing the article.

Another aspect of the invention resides in a method of gripping an article. The method comprises the steps of constricting the article radially, and pushing the article radially during the constricting step.

Additional features and advantages of the invention will be forthcoming from the following detailed description of preferred embodiments when read in conjunction with the accompanying drawing.

DESCRIPTION OF THE PREFERRED EMBODIMENTS

Figure 1:
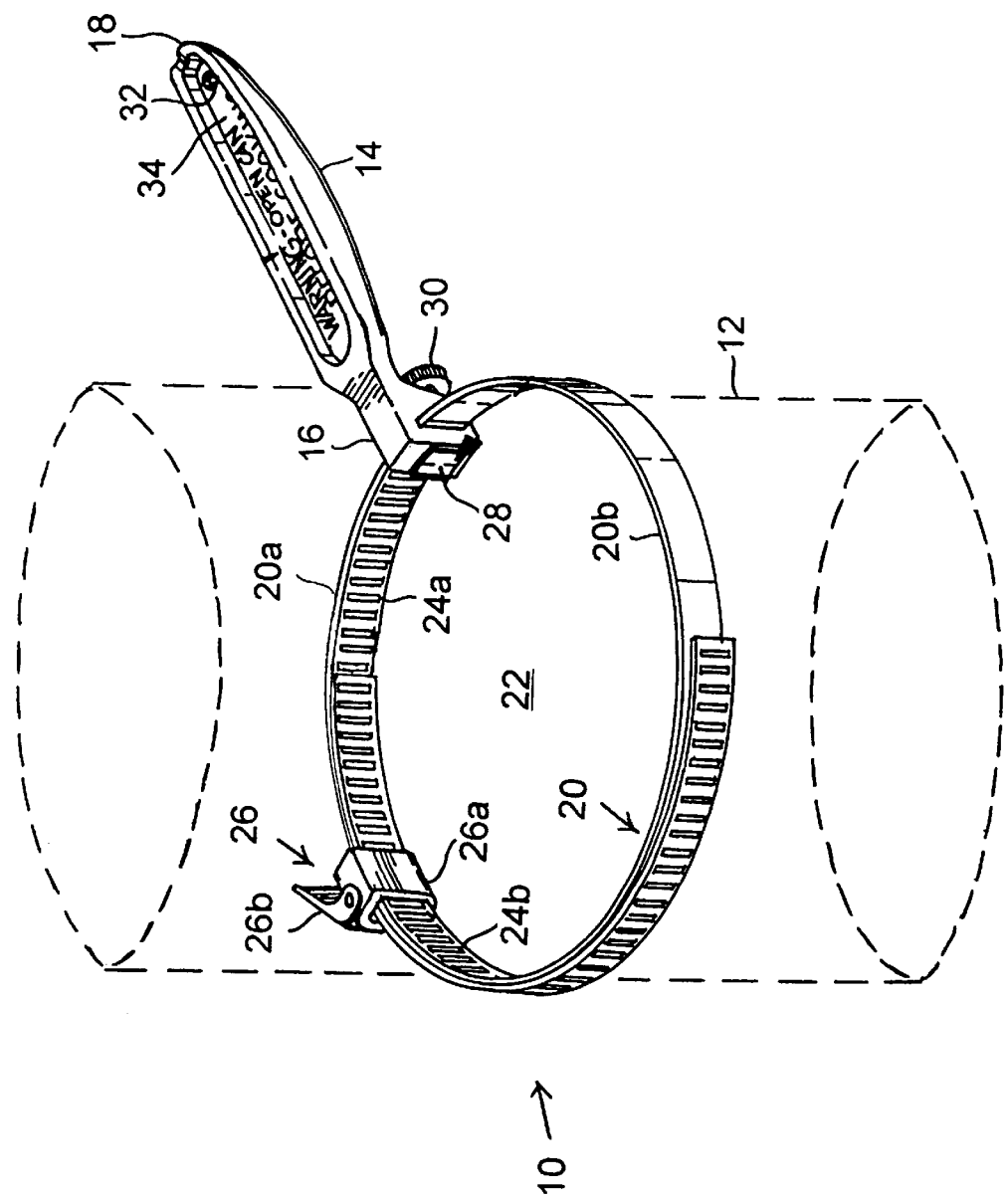
FIG. 1 is a perspective view of a device according to the invention for holding articles.

Referring to FIG. 1, the numeral 10 identifies a device in accordance with the invention for holding an article 12. The article 12 is here assumed to be a can of food having a circular cross section. The holding device 10 includes an elongated handle 14 having opposite longitudinal ends 16 and 18.

The end 16 of the handle 14 resembles a block and serves as a mount or anchor for a clamping member 20 in the form of a strap or band. The clamping member 20, which is designed to encircle and grip the can 12, comprises a strap or band section 20a which projects from one side of the block-like handle end 16 and a strap or band section 20b which projects from an opposite side of the end 16. Each of the strap sections 20a,20b has a free end remote from the block-like handle end 16, and the strap sections 20a,20b are curved and overlap one another to define a circular loop 22. The clamping member 20 is made of a flexible and preferably resilient material so that the strap sections 20a,20b can be bent and straightened in order to change the diameter of the loop 22. This enables the clamping member 20 to be adjusted to the diameter of the can 12 and also permits the clamping member 20 to be adjusted to articles having larger or smaller diameters than the can 12.

The strap section 20a is provided with a series of slot-like openings 24a which are distributed over the length of the strap section 20a. The strap section 20b is similarly formed with a series of closely spaced, slot-like openings 24b which are, however, restricted to a part of the strap section 20b remote from the block-like handle end 16.

An arresting member 26 in the form of a clip is mounted on the clamping member 20. The clip 26 includes a base or housing 26a and a detent or locking element 26b which is pivotally secured to the base 26a. The base 26a defines a passage which is sufficiently high and wide to receive the overlapping strap sections 20a,20b.

The diameter of the loop 22 varies inversely with the amount of overlap of the strap sections 20a,20b, and the clip 26 functions to fix the diameter of the loop 22 at any selected value. To this end, the detent 26b is pivotable between a released position and a locked position illustrated in the drawing. The detent 26b is biased to the locked position by a suitable spring. The detent 26b comprises a nose or projection which, in the locked position, passes through an opening 24a of the strap section 20a and a registering opening 24b of the strap section 20b. Thus, in the locked position, the detent 26b prevents relative movement of the strap sections 20a,20b so that the diameter of the loop 22 cannot change.

Figure 2:
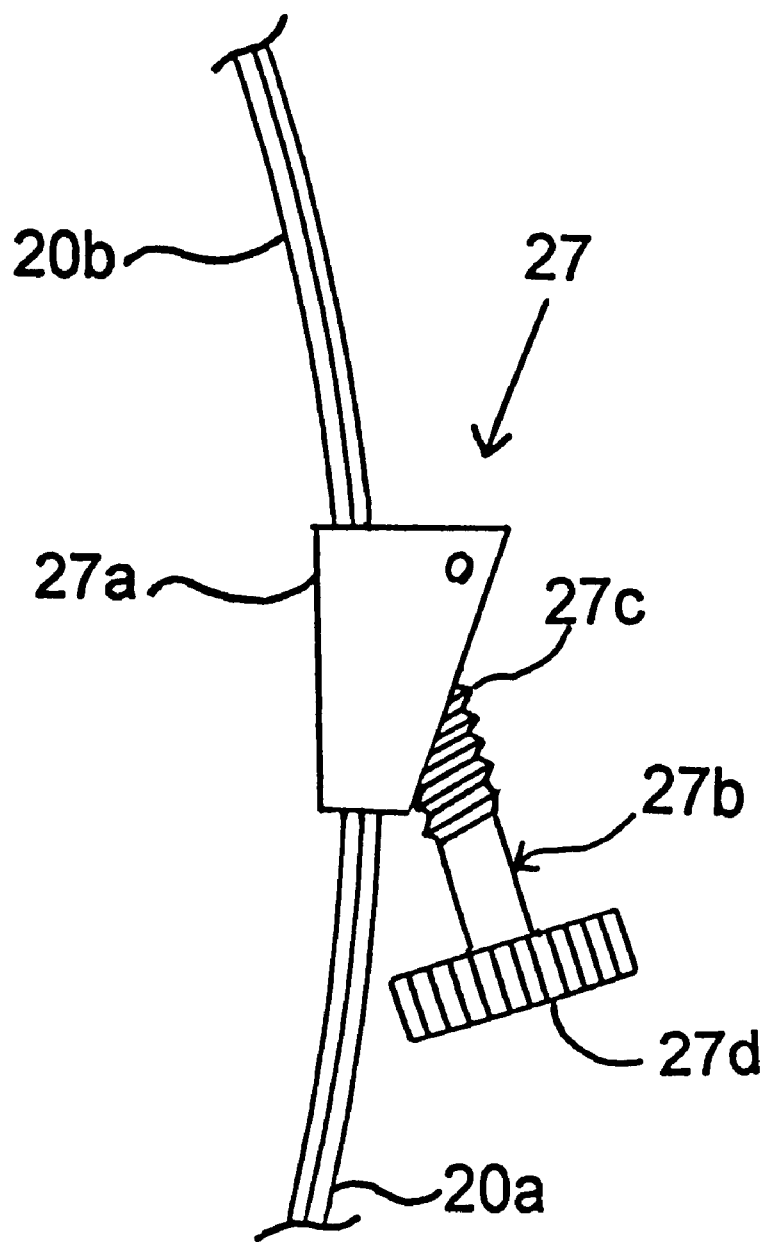
FIG. 2 is a plan view of an alternative embodiment of the arresting member of the invention.

In an alternative embodiment 27 of the arresting member illustrated in plan view in FIG. 2, a tightening screw 27c is added to the assembly to provide fine adjustment to the size and tightness of the clamping member 20. As in the first embodiment 26, the arresting member 27 consists of a clip that includes a base or housing 27a and a detent or locking element 27b which is pivotally secured to the base 27a. The locking element 27b consists of a threaded screw 27c rotatably mounted on an element (not seen in the figure) pivotally connected to the housing 27a such that it engages the slots 24a when in closed position. A knob 27d is provided to facilitate the turning of the screw 27c to tighten the clamping member 20. Again, the housing 27a defines a passage which is sufficiently high and wide to receive the overlapping strap sections 20a,20b, and includes a retaining means inside the clip (not shown) to press against and lock in place the strap section 20b when the locking element 27a is in closed position with the threads of the screw 27c engaging the slots 24a of the strap section 20a.

To disconnect the strap sections 20a,20b from one another, the detent 26b is moved to the released position. This is accomplished by pivoting the detent 26b clockwise relative to the base 26a as seen in the drawing. By pivoting the detent 26b clockwise sufficiently, the nose of the detent 26b is disengaged from the openings 24a,24b of the strap sections 20a,20b. The strap sections 20a,20b can then be moved relative to each other in order to change the diameter of the loop 22.

The block-like end 16 of the handle 14 further serves as a housing for an anchoring or stabilizing member 28 in the form of a short bar having a square or rectangular cross section. The longitudinal axis of the bar 28 extends radially of the loop 22, and the bar 28 is movable in radial direction of the loop 22 between a retracted position and an extended position. The bar 28 and the block-like handle end 16 each have a radially inner surface which faces the loop 22 and, in the retracted position of the bar 28, the radially inner surface of the bar 28 is flush with or behind the radially inner surface of the end 16. In the extended position of the bar 28, the latter projects from the end 16 into the loop 22.

The bar 28 is movable between the retracted and extended positions by a rotary knob or moving member 30 which is threaded into the block-like handle end 16 and is connected to the bar 28.

The longitudinal end 18 of the handle 14 is provided with an aperture 32. The aperture 32 allows the holding device 10 to be attached to or suspended from another object.

The handle 14 can be formed with an elongated depression 34 extending longitudinally of the handle 14. A comment, warning or information can be printed on or engraved in the handle 14 at the bottom of the depression 34. For instance, the handle 14 of a holding device 10 intended to grip a can while the contents are cooked may bear the legend "WARNING—OPEN CAN BEFORE COOKING".

The operation of the holding device 10 will be described assuming that the contents of the can 12 are to be cooked in the can 12 over a campfire. It is further assumed that the clip 26 is initially in the locked position and the bar 28 is initially in the retracted position.

The top of the can 12 is opened in any conventional manner. The clip 26 is brought to the released position and the diameter of the loop 22 adjusted so that the clamping member 20 fits around the can 12. The clamping member 20 is placed around the can 12 and thereupon tightened to the extent possible by holding the clip 26 in the released position and shifting the strap sections 20a,20b relative to one another in a sense reducing the diameter of the loop 22. Tightening of the clamping member 20 causes the latter to exert a constricting force on the can 12. After the clamping member 20 has been tightened, the clip 26 is returned to the locked position.

The knob 30 is now rotated to move the bar 28 to the extended position and into abutment with the can 12. The knob 30 is rotated as much as possible in order to forcefully engage the bar 28 and the can 12. The bar 28, which exerts a pushing force on the can 12, acts to anchor or stabilize the latter so that the can 12 is firmly held in the holding device 10. Once the bar 28 has been tightened, the handle 14 can be used to place the can 12 over the campfire.

Following cooking of the contents of the can 12, the contents can be transferred to a plate or eaten directly from the can 12. The can 12 may be removed from the holding device 10 by moving the bar 28 to the retracted position and the clip 26 to the released position. In the released position of the clip 26, the strap sections 20a,20b can be shifted relative to one another so as to increase the diameter of the loop 22 sufficiently to loosen the can 12.

The holding device 10 is capable of gripping articles having a relatively wide range of sizes. The clamping device 20 and the bar 28 permit the holding device 10 to secure a firm grip on an article even if the outer surface of the article is smooth. By reducing the diameter of the loop 22, the holding device 10 can be made more compact to facilitate transport.

The clip 26 can be replaced by other types of arresting members such as, for example, an arresting member containing a wing nut or one containing a knob. Similarly, a different means than the rotary knob 30 can be used to move the bar 28.

The holding device 10 is not restricted to the gripping of cans but is usable for a wide variety of other articles which may need to be equipped with a handle.

Various modifications, in addition to those above, are possible within the meaning and range of equivalence of the appended claims.

I claim:

1. A device for holding articles comprising:
   a handle;
   a clamping member on said handle designed to at least partly surround and grip an article, said clamping member being adjustable to the size of the article, and said clamping member at least in part defining a path which circumscribes the article when said clamping member grips the article; and
   an anchoring member on said handle designed to abut and stabilize the article, said anchoring member being movable from a retracted position to an extended position independently of said clamping member along a substantially straight line which intersects said path.

2. The device of claim 1, wherein said clamping member includes a band which defines a loop of variable circumference; and further comprising means for fixing the circumference of said loop at any of a plurality of values.

3. The device of claim 1, further comprising means for moving said anchoring member between said retracted position and said extended position.

4. The device of claim 1, wherein said anchoring member resembles a bar.

5. The device of claim 1, further comprising a screw adjustment for tightening said clamping member.

6. The device of claim 1, wherein said handle is provided with means for attaching said handle to an object.

7. The device of claim 6, wherein said attaching means comprises an opening through said handle.

* * * * *